United States Patent
Cox

(10) Patent No.: US 8,329,127 B2
(45) Date of Patent: Dec. 11, 2012

(54) COMBINED SLIP CATALYST AND HYDROCARBON EXOTHERM CATALYST

(75) Inventor: Julian Peter Cox, Malvern, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 13/233,512

(22) Filed: Sep. 15, 2011

(65) Prior Publication Data

US 2012/0107204 A1    May 3, 2012

Related U.S. Application Data

(60) Provisional application No. 61/383,112, filed on Sep. 15, 2010.

(51) Int. Cl.
*B01D 53/56* (2006.01)
*B01D 53/58* (2006.01)
*B01D 53/94* (2006.01)
*F01N 3/10* (2006.01)
*F01N 3/18* (2006.01)

(52) U.S. Cl. ............... 423/213.2; 423/213.5; 423/213.7; 423/239.1; 423/245.3; 423/215.5; 60/299

(58) Field of Classification Search ............ 502/325, 502/345, 527.12; 423/213.2, 213.5, 213.7, 423/239.1, 245.3, 215.5; 60/299
See application file for complete search history.

(56) References Cited

U.S. PATENT DOCUMENTS

| | | | |
|---|---|---|---|
| 7,485,271 B2 * | 2/2009 | Golunski et al. | 423/213.2 |
| 2007/0134145 A1 * | 6/2007 | Strehlau et al. | 423/213.5 |
| 2011/0143921 A1 * | 6/2011 | Hao et al. | 502/74 |

FOREIGN PATENT DOCUMENTS

| | | |
|---|---|---|
| EP | 0559021 | 9/1993 |
| EP | 1992409 | 11/2008 |
| EP | 2172268 | 4/2010 |
| WO | 2010083355 | 7/2010 |

OTHER PUBLICATIONS

International Search Report for PCT/US2011/051750 mailed Jan. 27, 2012 and Written Opinion of the ISR.

* cited by examiner

*Primary Examiner* — Timothy Vanoy
(74) *Attorney, Agent, or Firm* — Jimmie D. Johnson, Jr.

(57) ABSTRACT

A catalyst comprising: (a) a first layer comprising an oxidizing catalyst having an effective PGM loading such that oxidation of hydrocarbons generates sufficient heat to regenerate soot, wherein said effective amount of PGM is greater than about 10 g/ft$^3$; and (b) a second layer adjacent to said first layer and comprising a reducing catalyst to selectively reduce NOx.

20 Claims, 5 Drawing Sheets

COMBINED SLIP CATALYST AND HYDROCARBON EXOTHERM CATALYST

REFERENCE TO RELATED APPLICATION

This application claims priority to U.S. Provisional Application No. 61/383,112, filed on Sep. 15, 2010, which is hereby incorporated by reference in its entirety.

FIELD OF INVENTION

The invention relates generally to emission control of lean-burn engines, and, more specifically, to a catalyst that facilitates both exothermic oxidation of hydrocarbons and the removal of nitrogen-containing pollutant gases from exhaust gas.

BACKGROUND

Owning to environmental concerns, there is an ever present need to reduce emissions from internal combustion engines. Of particular interest herein are internal combustion engines operated using a lean air/fuel mixture, known as "lean-burn engines." A common lean-burn engine is a diesel engine. The emissions in the exhaust gas of a lean-burn engine can be divided into two groups—primary and secondary emissions. Primary emissions involve pollutant gases which are formed directly by the combustion process of the fuel in the engine and are present in the raw emission before passing through exhaust gas purification devices. The exhaust gas of lean-burn engines comprises the usual primary emissions of carbon monoxide (CO), hydrocarbons (HCs), nitrogen oxides (NOx), and soot (also known as particulate matter or PM), together with a relatively high oxygen content of up to 15% by volume. Secondary emissions are pollutant gases which can be formed as by-products in the exhaust gas purification units. Such secondary emissions may include, for example, "slip" ammonia (NH3) and NOx as discussed below.

Emission control systems have various configurations. For example, referring to FIG. 1, a typical emissions control system 100 for a diesel engine is shown. Immediately after the exhaust gas leaves the engine (not shown), a diesel oxidation catalyst (DOC) 101 oxidizes primary pollutants such as unspent fuel (hydrocarbons) and carbon monoxide to render them harmless. Other primary pollutants such as NOx cannot be oxidized, but instead must be reduced to nitrogen. Reducing NOx, however, tends to be more difficult because of the high oxygen content in the exhaust stream.

A known method of removing NOx from exhaust gases in the presence of oxygen is the process of selective catalytic reduction (SCR). SCR uses ammonia as a reducing agent over a suitable catalyst, SCR catalyst 103 as shown in FIG. 1. The reducing agent is introduced into the exhaust gas train using an injection nozzle 102. In place of ammonia, a compound which can readily be decomposed into ammonia, for example, urea can be used for this purpose.

To ensure complete reduction of the NOx, ammonia has to be added to the exhaust gas in at least a stoichiometric ratio to the nitrogen oxides, and excess ammonia is preferred to improve the conversion of NOx. Excess ammonia, however, significantly increases the risk of ammonia slipping past the SCR catalyst, and becoming a secondary emission. Ammonia that breaks through or slips past the SCR catalyst is referred to as "slip ammonia." Since ammonia is a gas which has a penetrating odor even in low concentrations, it is desirable to minimize slip ammonia. However, the precise metering of ammonia is difficult in internal combustion engines in motor vehicles because of the fluctuating operating conditions of motor vehicles (e.g., acceleration/deceleration). Therefore, inevitably excess ammonia will be injected into the system, resulting in significant ammonia slip downstream of the SCR catalyst.

The system 100 also comprises a Diesel Exotherm Catalyst (DEC) 105 behind the SCR 103 to facilitate periodic exothermic reactions to generate heat sufficient to regenerate the soot from a Catalyzed Soot Filter (CSF) 106. To this end, a hydrocarbon injector 104 is located just upstream of the DEC. The injector 104 injects fuel or HCs into the exhaust steam when the exhaust temperature is above the DEC light-off temperature. The DEC then oxidizes the HCs to generate an exotherm, which, in turn, heats the filter to clean the soot from it. Because the DEC is located behind the SCR, the SCR does not experience the detrimental high temperatures associated with removing the soot.

Although the DEC is good at oxidation, it has the potential to also unselectively oxidize any ammonia slip from the SCR catalyst and convert it to NOx, thereby increasing the NOx emissions. To counter this, one approach involves using an Ammonia Slip Catalyst (ASC) 201 as shown in FIG. 2. The ASC is selective for removing NH3 with minimal oxidation to NOx after the SCR catalyst 103, but in front of the HC injector 104. Typically the ASC has a low platinum group metals (PGM) loading (e.g., 0.5 to 10 g/ft3) to maximize the selectivity to N2. The disadvantage of this system is the additional catalyst volume required for the NH3 slip catalyst in an already large emissions control system 200.

Therefore, Applicant recognizes the need for a simplified exhaust system that eliminates ammonia slip while heating the exhaust stream periodically to regenerate soot from the soot filter. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a combination catalyst that functions, not only to oxidize slip ammonia and hydrocarbons in an exothermic reaction sufficient to generate enough heat to regenerate soot, but also to reduce NOx resulting from such oxidation. More specifically, Applicant found surprisingly that the high loading concentration in the oxidation catalyst needed for generating enough heat for soot regeneration was counteracted by a SCR catalyst in immediate proximity to the oxidation catalyst. This facilitates the integration of a traditional DOC and ASC, thereby simplifying an exhaust system that eliminates ammonia slip while heating the exhaust stream periodically to regenerate soot from the soot filter.

Accordingly, one aspect of the invention relates to a combination DOC/ASC catalyst that eliminates NH3 slip and heats the exhaust stream periodically to regenerate soot from the soot filter, while reducing secondary NOx emissions. In one embodiment, the combination catalyst comprises: (a) a substrate; (b) a first layer on the substrate, the first layer comprising an oxidizing catalyst having an effective PGM loading such that oxidation of hydrocarbons generates sufficient heat to regenerate soot, wherein, in one embodiment, the effective amount of PGM is greater than about 10 g/ft$^3$; and (c) a second layer adjacent to the first layer and comprising a reducing catalyst to selectively reduce NOx.

Another aspect of the invention relates to a method of using a combined catalyst to heat the exhaust stream periodically to regenerate soot while eliminating slip ammonia and NOx emissions. In one embodiment, the method comprises: (a) injecting a nitrogenous reductant into an exhaust flow having NOx; (b) reducing the NOx using the nitrogenous reductant in the presence of an SCR catalyst to form a NOx-reduced gas stream, which, at least intermittently, contains slip nitrogenous reductant; (c) injecting HC into the NOx-reduced gas stream to form an HC-enriched gas stream; and (d) contacting the HC-enriched gas stream with a combined catalyst to form a heated gas stream, the combined catalyst comprising a first layer having an oxidization catalyst to oxidize the slip nitrogenous reductant and the HC to heat the heated gas stream, and a second layer having a SCR catalyst to reduce NOx formed in the first layer.

Yet another aspect of the invention is an exhaust system that eliminates ammonia slip while heating the exhaust stream periodically to regenerate soot from the soot filter using a combination catalyst. In one embodiment, the system comprises: (a) a conduit for transmitting an exhaust gas having NOx from an engine to the atmosphere; (b) an injector for injecting nitrogenous reductant into the exhaust gas; (c) an SCR catalyst situated to contact the exhaust gas and reduce the NOx using the nitrogenous reductant to form a NOx-reduced gas stream, which, at least intermittently, contains slip nitrogenous reductant; (d) an HC injector for injecting HC into the NOx-reduced gas stream to form an HC-enriched gas stream; (e) a combined catalyst situated to contact the HC-enriched gas stream to form a heated gas stream, the combined catalyst comprising a first layer having an oxidization catalyst to oxidize the slip nitrogenous reductant and the HC to heat the heated gas stream, and a second layer having an SCR catalyst to reduce NOx in the heated gas stream; and (f) a filter disposed to contact the heated gas stream to regenerate soot contained in the filter.

DETAILED DESCRIPTION

Figure 1:
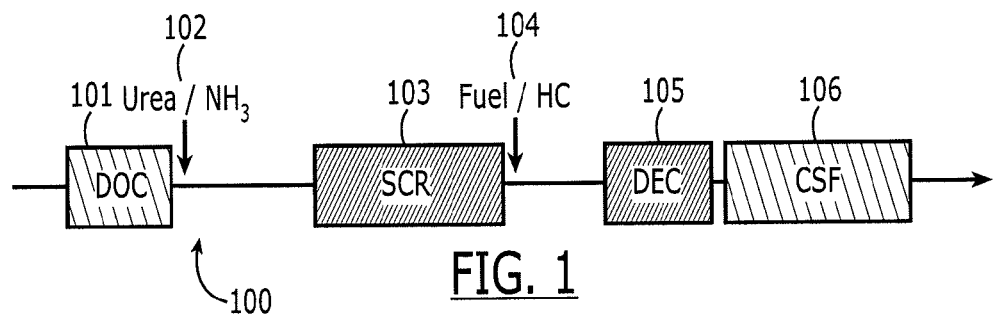
FIG. 1 shows a typical urea SCR system configuration with downstream fuel injector.
Figure 2:
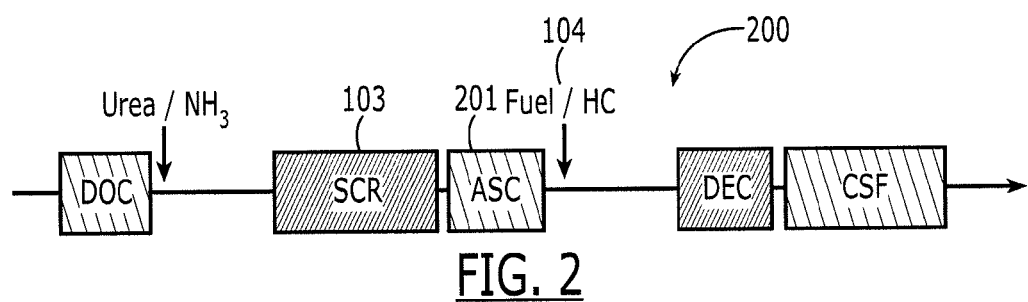
FIG. 2 shows the SCR system of FIG. 1 with an ammonia slip catalyst (ASC) after the SCR to minimize unselective NH3 oxidation by diesel exotherm catalyst (DEC).
Figure 3:
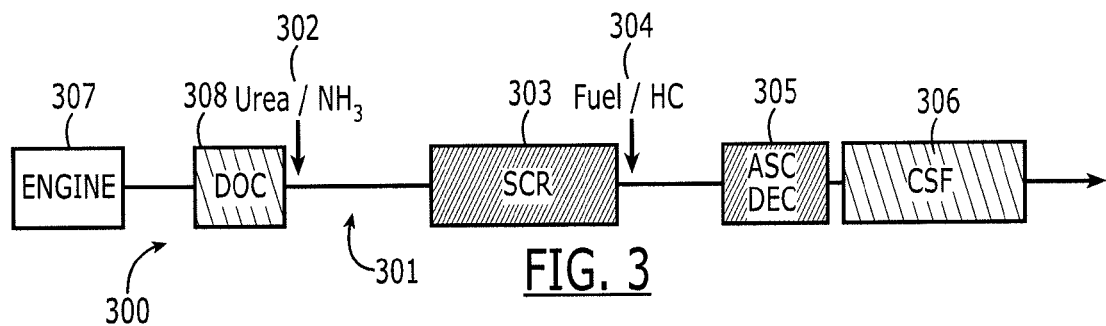
FIG. 3 shows an embodiment of the present invention in which the urea SCR system configuration with downstream fuel injector comprises a combined ammonia slip catalyst and diesel exotherm catalyst.

Referring to FIG. 3, an exhaust system 300 of the present invention is depicted schematically. As shown, the system 300 comprises a conduit 301 for transmitting an exhaust gas from an engine 307 to the atmosphere. It is known that such exhaust streams contain NOx. Downstream of the engine 307 is an injector 302 for injecting nitrogenous reductant into the exhaust flow. Following the injector 302 is a selective catalytic reduction (SCR) catalyst 303. It is situated to contact the exhaust gas and reduce the NOx using a nitrogenous reductant to form N2 and resulting in a NOx-reduced gas stream. Because the amount of NOx in the exhaust stream tends to vary considerably depending on, for example, acceleration/deceleration of the engine, operating temperatures, ambient temperature, etc., it is difficult to maintain a precise stoichiometric balance between nitrogenous reductant and NOx. Consequently, an abundance of nitrogenous reductant will be injected into the exhaust stream, resulting in a portion of it passing through the SCR and entering the NOx-reduced gas stream. This is referred to as slip nitrogenous reductant or, more particularly, slip ammonia.

Downstream of the SCR is a hydrocarbon (HC) injector 304 for injecting HC into the NOx-reduced gas stream to form an HC-enriched stream. A combined catalyst 305 is situated to contact the HC-enriched stream to form a heated gas stream of sufficient temperature (e.g., 400° C.) to regenerate soot contained in the catalyst soot filter (CSF) 306. The temperature required to regenerate soot can vary depending on the application. For example, typically the heated gas stream should be 550-650° C., however, additives may be added to the gas stream to reduce the required temperature to about 450° C. and perhaps lower.

Figure 7:
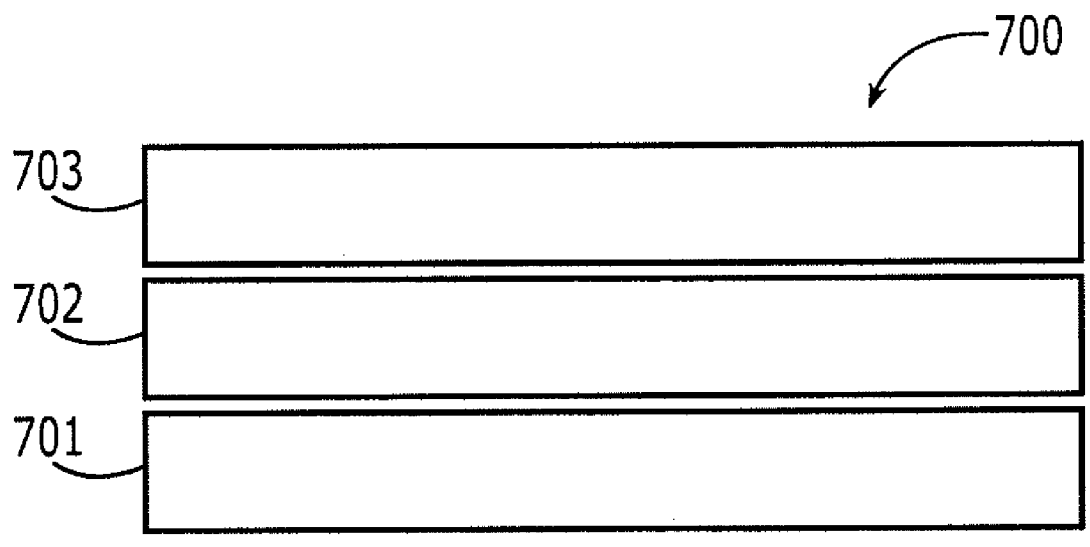
FIG. 7 shows a schematic diagram of one embodiment of the combination catalyst of the present invention.

Referring to FIG. 7, a schematic of one embodiment of the combined catalyst 700 is shown. The combined catalyst 700 comprises a substrate 701 upon which a first layer 702 having an oxidation catalyst is disposed. The oxidation catalyst oxidizes the slip nitrogenous reductant and the injected HC in the HC-enriched steam. The oxidization catalyst has an effective amount of PGM (e.g., greater than 10 g/ft 3) to cause the oxidation reaction to be sufficiently exothermic to heat the heated gas stream to a suitable regeneration temperature (e.g., 400-550° C.). The catalyst 700 also comprises a second layer 703, which, in this embodiment, overlays the first layer 702. The second layer comprises an SCR catalyst for reducing NOx in the enriched stream or generated form the HC and nitrogenous reductant oxidation in the first layer 702.

The system, the combined catalyst, and its use are described below in greater detail with respect to certain non-limiting embodiments.

Referring back to FIG. 3, the engine 307 may be any lean-burn type of engine, including, for example, a diesel engine, a lean-burn gasoline engine or an engine powered by liquid petroleum gas or natural gas.

In the embodiment shown in FIG. 3, the system 300 also has a diesel oxidation catalyst (DOC) 308. The DOC 308 is a well known device that uses a chemical process to break down pollutants in the exhaust stream into less harmful components. More specifically, DOCs typically utilize precious metals catalysts to reduce the particulate matter (PM), hydrocarbon based soluble organic fraction (SOF), and carbon monoxide content of diesel exhaust by simple oxidation. A typical DOC is a flow through device comprising a canister containing a honeycomb-like structure or substrate. The substrate has a large surface area that is coated with an active catalyst layer. This active layer contains a small, well dispersed amount of the precious metals. As the exhaust gases traverse the catalyst, carbon monoxide, gaseous hydrocarbons and liquid hydrocarbon particles (unburned fuel and oil) are oxidized, thereby reducing harmful emissions.

Downstream of the DOC 308 is the nitrogenous reductant injector 302, which is also well known. It serves to meter an appropriate amount of nitrogenous reductant in to the exhaust system. Several reductants are used in SCR applications include ammonia per se, hydrazine, anhydrous ammonia, aqueous ammonia or an ammonia precursor selected from the group consisting of urea ($(NH_2)_2CO$), ammonium carbonate, ammonium carbamate, ammonium hydrogen carbonate and ammonium formate. Pure anhydrous ammonia is toxic and difficult to safely store, but needs no further conversion to react with an SCR catalyst. Aqueous ammonia must be hydrolyzed in order to be used, but it is safer to store and transport than anhydrous ammonia. Urea is the safest to store, but requires conversion to ammonia through thermal decomposition in order to be used as an effective reductant.

As is known, the injector 302 is controlled by a controller (not shown), which monitors a number of engine and exhaust parameters and determines the appropriate amount of nitrogenous reductant to inject. Such parameters include, for example, exhaust gas NOx concentration, exhaust gas temperature, catalyst bed temperature, accelerator position, mass flow of exhaust gas in the system, manifold vacuum, ignition timing, engine speed, lambda value of the exhaust gas, the quantity of fuel injected in the engine and the position of the exhaust gas recirculation (EGR) valve and thereby the amount of EGR and boost pressure.

The SCR catalyst is also well known and typically comprises a microporous material containing one or more transitional metals. SCR catalysts are manufactured from various ceramic materials used as a carrier, such as titanium oxide, and active catalytic components are usually oxides of base metals (such as vanadium and tungsten), molecular sieves, such as zeolites, and various precious metals. The two most common designs of SCR catalyst geometry used are honeycomb and plate. The honeycomb form usually is an extruded ceramic applied homogeneously throughout the ceramic carrier or coated on the substrate. Plate-type catalysts have lower pressure drops and are less susceptible to plugging and fouling than the honeycomb types, but plate configurations are much larger and more expensive. Honeycomb configurations are smaller than plate types, but have higher pressure drops and plug much more easily. SCR catalysts suitable for use in the present invention are disclosed, for example, in molecular sieve/zeolite-based catalysts. In one embodiment, the SCR catalyst is a transition metal-exchanged zeolite.

In the embodiment shown in FIG. 3, the SCR catalyst is upstream of the combined catalyst 305. Such an arrangement is generally preferred (although not necessary) for engines that run intermittently such that the SCR 303 heats up quickly and thus reaches peak efficiency quickly. Furthermore, in this configuration, it is not exposed to the heated gas stream which can be detrimental to the SCR catalyst.

Downstream from the SCR catalyst but prior to the combined catalyst 305, an HC injector injects HC (typically fuel for the engine) into the low-NOx gas stream to form the HC-enriched gas stream. Like the nitrogenous reductant injector, the HC injector is controlled by a controller (not shown) which is configured to periodically cause a certain amount of HC to be injected into the stream to periodically regenerate soot that is captured in the CSF 306. The frequency at which the soot needs to be regenerated and thus the frequency and amount of HC that needs to be injected is an optimization of the system which is well known to one of skill in the art.

An important aspect of the invention is the combined catalyst 305. It combines the functionality of an ASC 201 and a DEC 105. As mentioned above, it was found that, while a relatively high PGM loaded oxidation catalyst improved the oxidation of the HCs and nitrogenous reductant, the coating of SCR catalyst was surprisingly able to limit the formation of NOx. The catalyst of the invention is thus able to generate sufficient heat for soot regeneration through exothermic oxidation while selectively oxidizing slipped ammonia.

The multi-functionality of the combined catalyst is presumably due to a number of reactions and interactions within the combined catalyst. Without being bound to any particular theory, it is presumed that, first, NOx from the oxidation and slip ammonia from the exhaust gas are absorbed on the second layer which is an SCR-active coating and react in a selective catalytic reaction to form water and nitrogen which desorb after conclusion of the reaction. Here, ammonia is present in a superstoichiometric amount. Second, slip ammonia, which has not been used or absorbed in the SCR layer, and the HCs pass through the second layer to the first layer. The second layer has a powerful oxidizing action and produced nitrogen and nitrogen oxides from the slip ammonia and produced water, carbon dioxide and exothermal heat from the HCs. The nitrogen formed diffuses/passes unchanged through the second layer and goes into the atmosphere. Third, after the nitrogen oxides are formed in the first layer, they pass through or by the SCR catalyst of the second layer, where they are reacted with previously-stored/slip ammonia in an SCR reaction to form $N_2$. Therefore, the SCR/oxidation/SCR process that occurs as the HC enriched gas passes through the combined catalyst serves as a self regulating system in which oxidation is promoted, but over oxidation is controlled.

Referring to FIG. 7, one embodiment of the catalyst 700 is shown. The catalyst comprises a substrate 701, which may comprise any known substrate material used in this application, including, for example, alumina. Alternatively, the catalyst may be an extruded catalyst as is well known in the art. Furthermore, the substrate may be configured in any known configuration, including, for example, honeycomb or monolith. In one particular embodiment, the substrate is a honeycomb alumina.

As shown in FIG. 7, the first and second layers 702, 703 are configured such that the second layer 703 overlays the first layer 702. It should be understood, however, that other configurations are within the scope of the invention. For example, the first and second layers may be deposited along the substrate such that the first layer is upstream of the second layer. Alternatively, a series of alternating first and second layers may be used. Still other configurations will be obvious to one of skill in the art in light of this disclosure.

As mentioned above, the first layer comprises the oxidizing catalyst. The catalyst should be selected to ensure oxidation of the HCs and nitrogenous reductant to the extent that a significant exothermal reaction is achieved. Specifically, the exothermal reaction needs to be sufficient to heat the heated gas stream to the point that it is capable of regenerating soot in the CSF 306. Generally, this will require heating the gas to at least about 400° C. Optimum regeneration occurs at about 550 to about 650° C. To this end, the catalyst should comprise a microporous material, such as a zeolite or non-zeolite (e.g. alumina, ceria, zirconia, titania, or similar materials individually or in combination), sufficiently loaded with PGM to provide the desired exotherm. Generally, the greater the PGM loading the more reactive the catalyst.

In addition to having sufficient PGM loading to ensure adequate regeneration temperatures as described above, the PGM loading should be sufficient such that the light-off temperature for exothermal generation of heat from HC is less than about 350° C. Generally, lower light-off temperatures are desirable. If the light-off temperature is greater than about 350° C., then an auxiliary system may be required to heat the upstream exhaust gas. Such systems increase the complexity of the exhaust system and reduce fuel efficiency, and, thus, are generally undesirably. Applicant has found that the temperature of the exhaust gas reaching the DEC is generally (although not necessarily) less than 350° C. Therefore, in one embodiment, the catalyst of the present invention has a PGM type and loading sufficient such that the catalyst light-off temperature is less than 350° C., and, in a more particular embodiment, is less than 325° C. The preparation of the oxidation layer to provide this desired performance would be known to those of skill in the art in light of this disclosure.

Given the need for high regeneration temperatures and a relatively low light-off temperature, the PGM loading required is typically greater than that used in traditional ASC catalysts, which tend to be less than 10 g/ft3. (Loading in an ASC catalyst is typically kept relatively low to avoid over oxidation of the slip ammonia and the generation of NOx.) Accordingly, in one embodiment, the PGM loading is greater than that of traditional ASC catalyst. In one embodiment, the loading is greater than about 10 g/ft3. In another embodiment, the loading is great than about 10 g/ft3 and less than about 100 g/ft3. In another embodiment, the loading is about 15 g/ft3 to about 70 g/ft3. In yet another embodiment, the loading is about 20 g/ft3.

In one embodiment, the PGM comprises palladium (Pd) and/or platinum (Pt). In another embodiment, the PGM comprises a combination of Pd and Pt. Generally, Pd promotes exothermic oxidation, and Pt tends to generate NOx from NH3. Accordingly, the relative concentrations in a mixture of Pd and Pt will tend to depend on the amount of oxidation versus NOx generation desired. The relative loading of Pd to Pt may vary from a ratio of 1:10 to 10:1. In one particular embodiment, the PGM comprises a combination of essentially equal portions of Pt and Pd for a total loading of about 15-70 g/ft3.

The second layer comprises the SCR catalyst. Such catalysts are well known and described above with respect to SCR catalyst 303. Generally, the SCR catalyst comprises a the SCR catalyst comprising at least (i) a microporous crystalline molecular sieve comprising; and (ii) a transition metal impregnated in the molecular sieve.

The molecular sieve may be any known or later-developed microporous structure suitable for use as a catalyst, including zeolite and non-zeolite sieves (as defined by U.S. Pat. No. 4,913,799 (incorporated herein by reference)). In one embodiment, the molecular sieve comprises at least silicon, aluminium and phosphorous and has an 8-ring pore opening structure. In one embodiment, the molecular sieve is a silicoaluminophosphate (SAPO) molecular sieve. In one embodiment, the SAPO molecular sieves have one or more of the following framework types as defined by the Structure Commission of the International Zeolite Association: AEI, AFX, CHA, LEV, LTA, In one embodiment, the framework type is CHA, or CHA in combination with one or more different framework types, such as, for example, AEI-CHA intergrowths. Examples of suitable CHA SAPOs include SAPO-34 and KYT-6. In one particular embodiment, the molecular sieve is SAPO-34. In another embodiment, the catalyst comprises two or more different SAPO molecular sieves selected from the group consisting of AEI, AFX, CHA, LEV, and LTA. In one embodiment, the zeolite has a framework type selected from AEI, AFX, CHA, LEV, LTA, BEA, MFI, FER, MOR and KFI. An example of a suitable BEA zeolite is beta zeolite.

In addition to the molecular sieve, the SCR catalyst comprises a transition metal imbedded in the sieve. Suitable transition metals include, for example, Cr, Mn, Fe, Co, Ce, Ni, Cu, Zn, Ga, Mo, Ru, Rh, Pd, Ag, In, Sn, Re, Ir, Au, Pr, Nd, W, Bi, Os, and Pt. In one embodiment, the transition metal is Cu or Fe or combinations thereof. In one embodiment, the transition metal loading is about 0.3 wt % to about 10 wt % of the catalyst. The type and concentration of the transmission metal can vary according to sieve and the application. For example, suitable results have been achieved with SAPO-34 loaded with about 2 wt % Cu, and beta zeolite loaded with about 3 wt % Fe. Still other combinations of sieves, transition metals and loading concentrations will be obviousness to those of skill in the art in light of this disclosure.

SCR catalysts may comprise a substrate manufactured from a ceramic material, such as cordierite, mullite, silica, alumina, titania, or their combinations. Alternatively, the substrate can be metallic. The two most common substrate designs are monolith or plate and honeycomb. Plate-type catalysts have lower pressure drops and are less susceptible to plugging and fouling than the honeycomb types, but plate configurations are much larger and more expensive. Honeycomb configurations are smaller than plate types, but have higher pressure drops and plug much more easily. Alternatively, the catalyst may be an extruded with or without a substrate. In the latter embodiment, the catalyst has no discrete substrate. In yet another embodiment, the catalyst is not supported at all, but is provided in bulk.

The combination catalyst 305 can be prepared using known techniques. For example, Canadian Application No. 2,652, 837 (based on PCT Publication No. 2007/137675), hereby incorporated by reference, discloses a suitable preparation procedure, although the PGM loading of the oxidation layer of the present invention needs to be higher than that disclosed in that reference.

The heated gas leaves the combined catalyst 305 and contacts the CSF 306 at which point the soot is regenerated. Such a process is well known and will not be discussed in detail herein.

EXAMPLES

The following non-limiting examples compare five embodiments of the combined catalyst of the present invention (samples 2-6) to a conventional DEC catalyst (sample 1) and a conventional ASC (sample 7) as set forth in Table 1 below.

TABLE 1

| Sample | Description |
| --- | --- |
| 1 | DEC only (no SCR layer) 35 g/ft3 Pt; 35 g/ft3 Pd |
| 2 | Combined catalyst - Oxidation layer 35 g/ft3 Pt; 35 g/ft3 Pd; SCR layer beta zeolite loaded with 3 wt % Fe |
| 3 | Combined catalyst - Oxidation layer 40 g/ft3 Pt; SCR layer SAPO-34 loaded with 2 wt % Cu. |
| 4 | Combined catalyst - Oxidation layer 35 g/ft3 Pt; SCR layer beta zeolite loaded with 3 wt % Fe. |
| 5 | Combined catalyst - Oxidation layer 20 g/ft3 Pt; SCR layer SAPO-34 loaded with 2 wt % Cu. |
| 6 | Combined catalyst - Oxidation layer 10 g/ft3 Pt; SCR layer SAPO-34 loaded with 2 wt % Cu. |
| 7 | ASC only (no oxidizing layer) 1 g/ft3 Pt SAPO-34 loaded with 2 wt % Cu. |

In these samples, the oxidation layer was prepared by preparing a wet slurry of alumina loaded with the indicated PGM at the indicated concentration, and then wash coating a standard ceramic honeycomb substrate with the slurry. The SCR layer was prepared by preparing a mixture of the indicated microporous material (either SAPO-34 or beta zeolite) loaded with the indicated amount of Cu or Fe through ion exchange, adding a binder to the mixture, and then wash coating the oxidation layer with the mixture.

Light-Off Temperature

Figure 4:
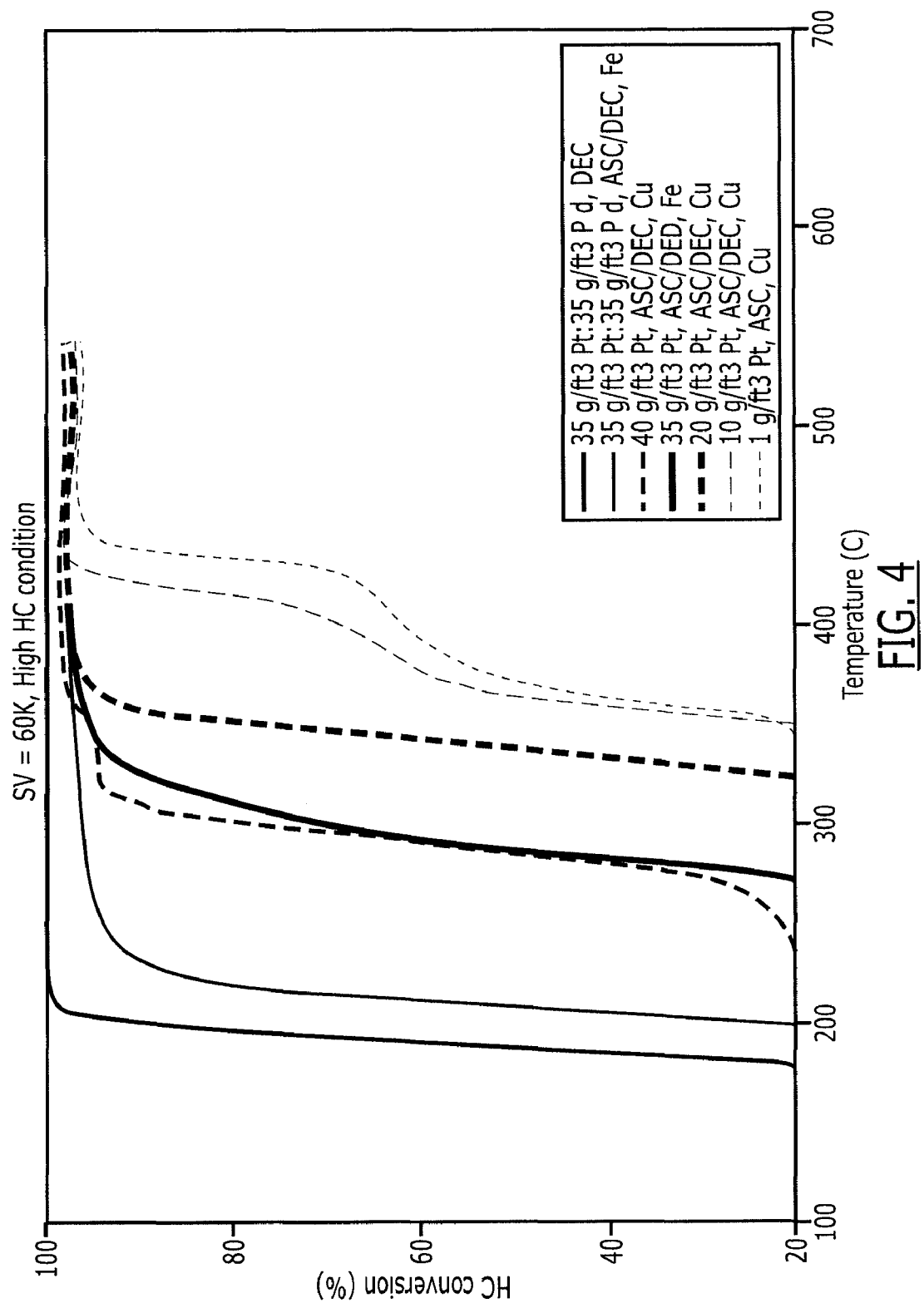
FIG. 4 shows HC conversion for a light-off test under high hydrocarbon (exotherm) conditions for a standard DEC, a standard ASC, and a combined DEC/SCR catalysts of the present invention.

FIG. 4 shows the results of a light-off test (HC oxidation) at high HC concentrations (typical for a DEC to generate an exotherm to clean a filter). This was a steady-state light-off test in an atmosphere of 12% O2, 200 ppm NH3, 200 ppm CO, 1000 ppm C10H22, 4.5% H2O, 4.5% CO2, and the balance N2.

Although Sample 1, the conventional DEC, had the lowest light-off temperature (<200° C.), Sample 2, the Pt/Pd combined catalyst, and Samples 3-5, the Pt combined catalysts with 20-35 wt % Pt, also demonstrated suitable light-off temperatures (i.e., <350° C.). Sample 6, the 10 g/ft3 Pt combined catalyst had a light-off temperature of about 350° C., which is generally (although not necessarily) too high. Likewise, Sample 7, the low PGM loaded standard NH3 slip catalyst (1 g/ft3 Pt) also had a light-off temperature of about 350° C. Therefore, these results indicate that a combination catalyst with suitable light-off temperature is achieved with an oxidation layer having a PGM concentration above 10 g/ft3.

NH3 Conversion

Figure 5:
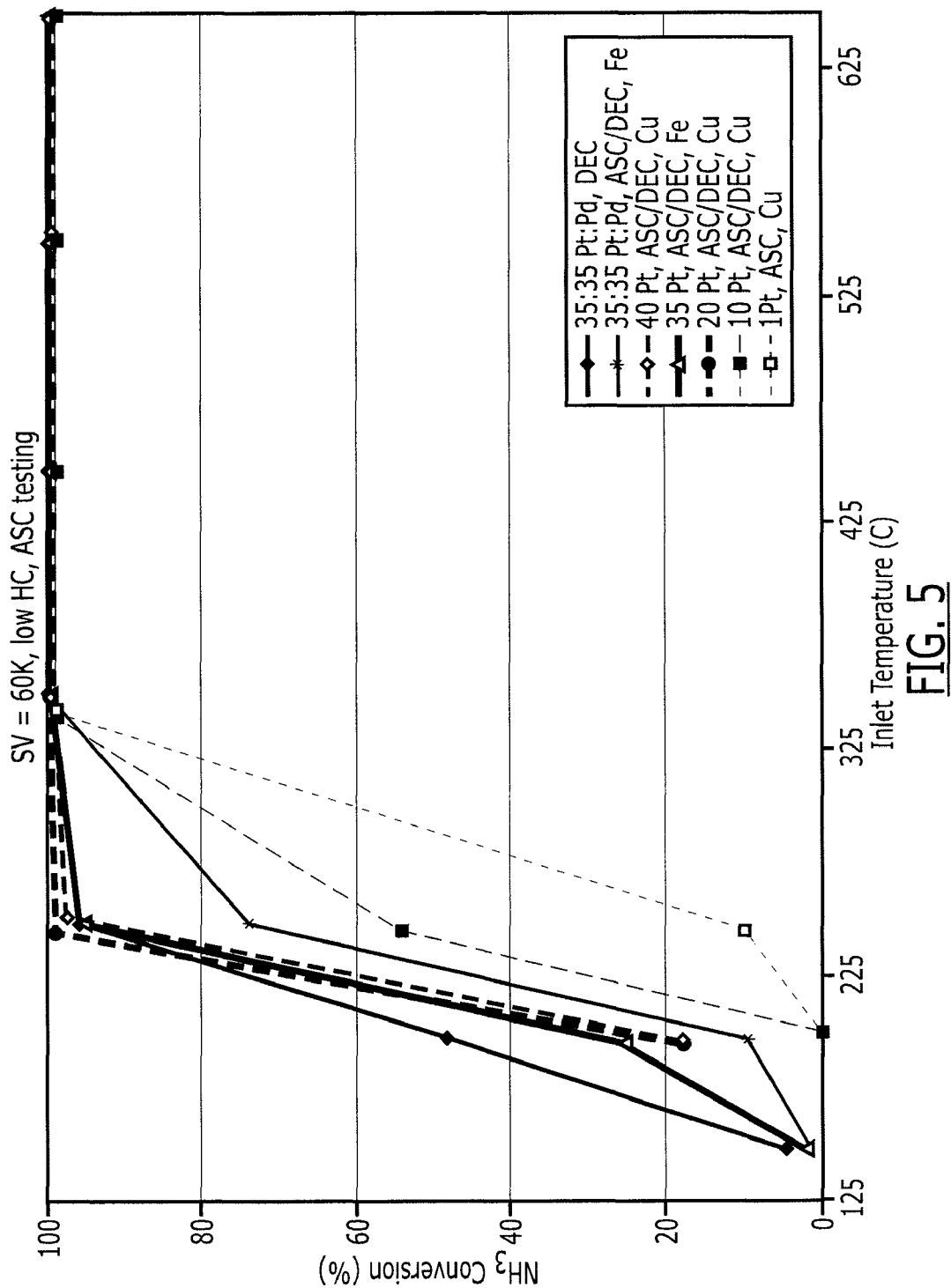
FIG. 5 shows the performance for NH3 conversion for the same catalysts as tested with respect to FIG. 4 under low hydrocarbon conditions.

FIG. 5 shows NH3 conversion under standard diesel operation conditions with low hydrocarbon concentrations (non-exotherm generation) in an atmosphere of 12% O2, 200 ppm NH3, 200 ppm CO, 100 ppm C3H6, 4.5% H2O, 4.5% CO2, with the balance N2. Here, all of the samples show acceptable NH3 conversion—i.e., nearly 100% NH3 conversion at about 325° C.

Selectivity

Figure 6:
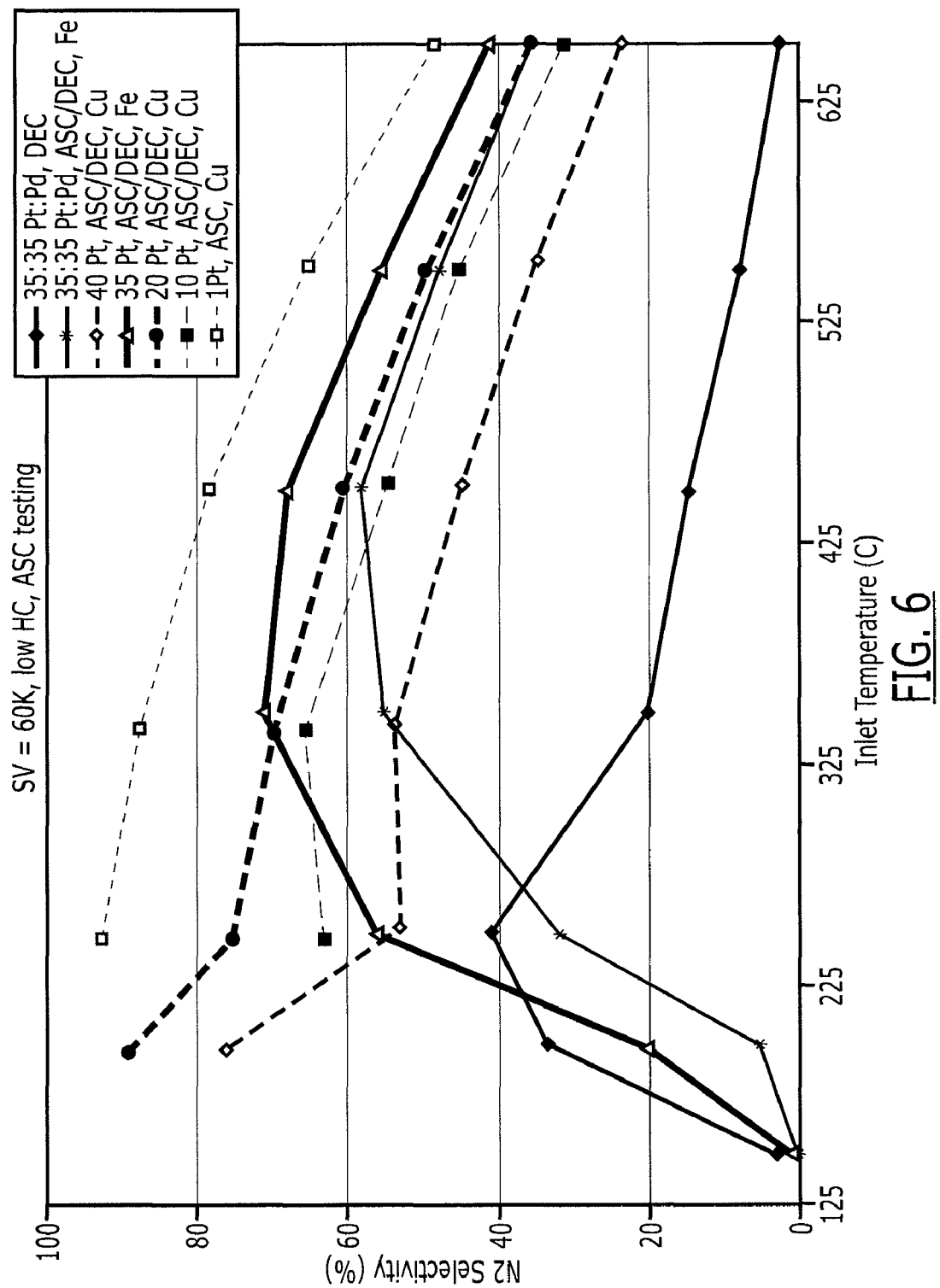
FIG. 6 shows the performance for selective conversion of NH3 to N2 for the same catalysts as tested with respect to FIGS. 4 & 5 under low hydrocarbon conditions.

FIG. 6 shows each sample's performance in selectively converting NH3 to N2. This experiment was a steady-state light-off test under the same atmospheric conditions as in the NH3 conversion of FIG. 5. Sample 1, the standard DEC had the lowest selectivity with a peak of 40% at relatively low temperatures and decreasing to less than 10% with higher temperatures. Samples 2-6, the combined catalysts, had significantly better selectivity having a peak of about 55-70% between about 325 and 425° C., which is a common operating temperature range. Samples 4 and 5, the 35 g/ft3 and 20 g/ft3 Pt combined catalysts, show particular high selectivity of about 70% between 325 and 425° C. Such selectivity is comparable to Sample 7, a traditional ASC.

Therefore, these examples show that the combination catalyst of the present invention offers the benefit of good selectivity for nitrogenous reductant slip control, which can be maintained even with higher PGM loading in the oxidation catalyst for improved HC oxidation for exotherm generation. Adding Pd to the Pt containing lower layer also improves the HC oxidation ability of the catalyst while also improving the NH3 selectivity to N2.

What is claimed is:

1. A method for generating heat for soot removal and reducing NH3 slip in an exhaust system, said method comprising:
   injecting nitrogenous reductant into an exhaust flow having NOx;
   reducing said NOx using said nitrogenous reductant in the presence of an SCR catalyst to form a NOx-reduced gas stream, which, at least intermittently, contains slip nitrogenous reductant;
   injecting HC into said NOx-reduced gas stream to form a HC-enriched gas stream;
   contacting said HC-enriched gas stream with a combined catalyst to form a heated gas stream, said combined catalyst comprising a first layer having an oxidization catalyst to oxidize at least a portion of said HC to heat said heated gas stream, and a second layer having an SCR catalyst to reduce at least a portion of NOx in said heated gas stream; and
   contacting said heated gas stream with a soot filter to regenerate soot in said filter.

2. The method of claim 1, wherein said oxidization catalyst comprises PGM in an amount greater than about 10 g/ft$^3$.

3. The method of claim 1, wherein said effective amount of PGM is about 15 g/ft$^3$ to about 70 g/ft$^3$.

4. The method of claim 3, wherein the PGM is selected from the group consisting of Pt and Pd and combinations thereof.

5. The method of claim 3, wherein the PGM consists essentially of Pt.

6. The method of claim 3, wherein said SCR catalyst is a molecular sieve loaded with about 0.3 to about 10 weight percent of a transition metal selected from is Cu, Fe, and combinations thereof, and wherein said molecular sieve is a SAPO or a zeolite having a framework type selected from CHA, AEI, LEV, LTA, BEA, MFI, FER, MOR, KFI, or BEA.

7. The method of claim 1, wherein said oxidization catalyst comprises PGM in an amount sufficient to produce a light-off temperature of less than 350° C.

8. The method of claim 1, wherein said first layer is upstream of said second layer.

9. The method of claim 1, wherein said second layer overlays said first layer.

10. The method of claim 1, wherein said first and second layers are on a honeycomb substrate.

11. The method of claim 1, wherein said contacting step heats said HC-enriched gas stream to temperature of about 400° C. to about 650° C.

12. An exhaust treatment system comprising:
   a conduit for transmitting an exhaust gas having NOx from an engine to the atmosphere;
   an injector for injecting nitrogenous reductant into said exhaust gas;
   an SCR catalyst situated to contact said exhaust gas and reduce said NOx using said nitrogenous reductant to form a NOx-reduced gas stream, which, at least intermittently, contains slip nitrogenous reductant;
   an HC injector for injecting HC into said NOx-reduced gas stream to form an HC-enriched gas stream;
   a combined catalyst situated to contact said HC-enriched gas stream to form a heated gas stream, said combined catalyst comprising a first layer having an oxidization catalyst to oxidize said slip nitrogenous reductant and said HC to heat said heated gas stream, and a second layer having an SCR catalyst to reduce NOx in said heated gas stream; and
   a filter disposed to contact said heated gas stream to regenerate soot contained in said filter.

13. The system of claim 12, wherein said effective amount of PGM is about 15 g/ft$^3$ to about 70 g/ft$^3$.

14. The system of claim 13, wherein the PGM is selected from the group consisting of Pt and Pd and combinations thereof.

15. The system of claim 13, wherein the PGM consists essentially of Pt.

16. The system of claim 13, wherein said SCR catalyst is a molecular sieve loaded with about 0.3 to about 10 weight percent of a transition metal selected from is Cu, Fe, and combinations thereof, and wherein said molecular sieve is a SAPO or a zeolite having a framework type selected from CHA, AEI, LEV, LTA, BEA, MFI, FER, MOR, KFI, or BEA.

17. The system of claim 12, wherein said first layer is upstream of said second layer.

18. The system of claim 12, wherein said second layer overlays said first layer.

19. The system of claim 12, wherein said first and second layers are on a honeycomb substrate.

20. The system of claim 12, further comprising a diesel oxidation catalyst disposed upstream of the injector for injecting nitrogenous reductant.

\* \* \* \* \*